Patented Aug. 14, 1928.

1,680,856

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

METHOD OF TREATING RUBBER LATEX.

No Drawing. Application filed August 28, 1925. Serial No. 53,207.

This invention relates to the preparation of a rubber latex which will deposit its rubber rapidly upon a body pervious to water but not to the rubber particles of latex.

The object of the invention is accordingly to provide a method for treating aqueous dispersions of rubber such as rubber latex so that the rubber in the latex may be rapidly deposited upon a porous body. Another object of the invention is to provide a method for treating a rubber latex in such a way that the increased rate of deposit of the rubber therein remains practically constant during its period of usefulness. Still another object of the invention is to accomplish this increased rate of deposit without causing coagulation and without impairing the stability of the latex. A further object of the invention is to provide a latex having the property of rapidly depositing its rubber on a porous body, without destroying the translucency of the rubber contained therein. Still another object is to increase the rate of deposit of the rubber in a latex by the liberation of metallic ions within the latex.

With a preferred embodiment in mind but without desiring to limit the invention beyond what may be required by the prior art, the invention briefly stated consists in treating rubber latex, preserved or otherwise treated or untreated, with a suitable concentration of bivalent metal ions such as zinc ions and maintaining the latex at ordinary temperatures or elevated temperatures until the latex has acquired the property of rapidly depositing its rubber upon a body pervious to the aqueous portion of the latex but substantially impervious to the rubber. The invention also includes treating latex, preserved or otherwise treated or untreated, with zinc in combination and a salt of an organic acid adapted to react with the zinc to liberate zinc ions in the latex.

As a specific illustration of the manner of carrying out the invention, the following may be given: 100 parts by weight of rubber in the form of ammonia-preserved 33% latex, which may or may not have been twice creamed by treatment with pectin bodies, are mixed with 3 parts by weight of zinc oxide, 3 parts by weight of fused sodium acetate, and 1 part by weight of glue. The mixture is then heated for 48 hours at 150° F. After this heating period the latex may have become considerably more viscous. It may also be observed that if a porous body such as unglazed porcelain be dipped into the latex for a period of five minutes, a layer of rubber about 0.025 inches thick will be formed on the porcelain. If the latex prepared according to the above example be allowed to stand for several weeks at ordinary temperatures, it does not ordinarily increase in viscosity, nor does the thickness of a layer of rubber deposited on a porous body show any considerable difference in thickness. Heating the mixture for an additional 20 hours at 150° F. does not alter the viscosity of the latex appreciably nor the thickness of the deposit. The stability of the treated latex is substantially the same as that of the latex before treatment.

The pectin-treated latex used in the above example may be prepared as follows: A pectin body is dissolved in water and added to ordinary ammonia-preserved latex so that the latex will contain approximately 1% of the pectin body. The treated latex is then allowed to stand, whereupon the rubber rises to the top in an uncoagulated layer. The aqueous portion beneath the rubber layer is removed and the layer shaken up in additional water, and the treatment with the pectin body repeated several times if desired.

The zinc oxide is preferably added as follows:—1 part by weight of glue is dissolved in 1¼ parts by weight of water. Into this glue solution are stirred 3 parts by weight of zinc oxide, a mortar being used to aid in making the mixture into a thick mush. The mush is then ground to a smooth paste in water, using a mortar for a small quantity of the material or a paint mixer for larger quantities. The proper amount of the thin paste of zinc oxide is added to the latex, and thereafter is added an aqueous solution of the sodium acetate.

Instead of employing latex which has been twice creamed with pectin bodies, it is also possible to use latex which has been creamed but once or more than twice. Ordinary ammonia preserved latex may be utilized in this invention instead of the pectin-treated latex. When ammonia-preserved latex is used it will be observed that the greater the concentration of ammonia in the latex, the faster is the increase in rate of deposit in the above example. This is particularly true where the ammonia concentration ranges between 0.2% and 0.7% and probably higher.

Instead of sodium acetate, the following salts may be used:—Sodium benzoate, sodium succinate, sodium lactate, sodium formate, sodium salicylate, sodium tartrate, and sodium oxalate, and it will be found that the thickness of the film deposited in the above described manner will depend somewhat upon the salt employed. For example, sodium oxalate yields a thinner film than the other salts mentioned.

An increase in the viscosity of the treated latex may be observed at times. This increased viscosity is frequently but not necessarily a measure of the increase in the rate at which the rubber in the latex will deposit on a porous body. The rate of deposit, and hence the thickness of the rubber layer derived from the latex may be high although the viscosity of the latex may be low. The opposite may also occur, where a latex of high viscosity deposits its rubber but slowly.

The increase in the rate of deposit (and of the viscosity of the latex, should such increase occur), is probably due to the incorporation of a suitable concentration of zinc ions in the latex. Other bivalent metals may be employed in combination instead of zinc, but it will be found that zinc is quite satisfactory both on account of its action and on account of its low cost. While the example has given zinc oxide and a salt of an oxy acid as the means of incorporating the zinc ions it is also within the scope of the invention to employ a thio acid instead of the oxy acid, and the thio acid may be in the form of an accelerator. The latex itself may be compounded or not, and may be a vulcanizable latex or a vulcanized latex. In these instances where the vulcanizing ingredient is an organic disulphide, it is probable that the disulphide reacts with the zinc oxide and ammonia to form a zinc salt which constitutes the source of zinc ions. The accelerators known as the thiol salts function in the same manner as the organic disulphide accelerators. Vulcanizing the latex with zinc oxide and a thiol salt has the effect of increasing the rate of deposit of the rubber on a porous body, and likewise increases the stability of the latex.

The present invention gives a simple and convenient means for treating latex so that the latex will deposit its rubber upon a porous form or pervious body at a much more rapid rate than untreated latex. The advantage of this increased rate of deposit is of great value in the manufacture of rubber articles by dipping processes and by electrodeposition. The latex may be used in the production of any of the articles which are made or can be made by dipping a suitable form into latex, or by filtering, or by electrodeposition, or by filling a porous form with the latex.

It is understood that the invention is not limited to the use of the herein described treated latex with porous forms, but it contemplates the utilization of any material which is pervious to the aqueous portion of the latex, but which restrains the rubber portion of the latex. The term "porous body" in the specification and claims is used in this broad sense. While the invention is primarily concerned with the direct utilization of natural latex in the formation of such rubber articles as inner tubes, gloves, finger cots, bathing caps, hose, and the like, it comprehends the use of artificially prepared latices which are susceptible of the same treatment with advantage in the deposit of rubber therefrom on the porous forms. It is further understood that the treated latex described herein may be utilized in the manufacture of rubber articles in any manner to which it is adaptable, such as coating, dipping, or any of the other manufacturing methods utilized in connection with uncoagulated natural latex or artificial latices, and in its broadest aspects the invention comprehends such use of the uncoagulated material.

Having thus described my invention, what I claim and desire to protect by Letters Patent is:

1. Process of manufacturing rubber articles which consists in treating a rubber dispersion with a metallic compound and an organic acid salt capable of reacting to liberate metallic ions in the dispersion to form an uncoagulated composition of increased filterability and depositing rubber from the latex thus obtained directly on a porous form in the shape desired to make the article.

2. A process for manufacturing rubber articles which consists in treating a rubber dispersion with a compound of a bivalent metal and a salt of an organic acid, disposing the treated dispersion in contact with a porous form of predetermined shape, and depositing the rubber from the dispersion on the form.

3. A process for manufacturing rubber articles which consists in treating a rubber latex with a compound of a bivalent metal and a salt of an organic acid, heating the latex at temperatures below 212° F., disposing the latex in contact with a porous form, depositing the rubber from the latex on the form, and recovering a rubber article of predetermined shape.

4. A process for manufacturing rubber articles which consists in treating rubber latex with a zinc compound and a salt of an organic acid, heating the treated latex at temperatures below 212° F., bringing the treated latex into contact with a filtering body of the desired shape, depositing the rubber upon the body, and recovering a rubber article.

5. A process for preparing rubber articles from stable uncoagulated rubber latex which comprises treating rubber latex with a zinc compound and a salt of an organic acid, and heating the treated latex at temperatures below 212° F., depositing the rubber from the latex upon a porous form of the desired shape, and recovering the rubber article from the form.

6. A process for preparing rubber articles from stable uncoagulated rubber latex which comprises treating rubber latex with a zinc compound and an inorganic salt of an organic oxy acid, and heating the treated latex at temperatures below 212° F., depositing the rubber from the latex upon a porous form of the desired shape, and recovering the rubber article from the form.

7. A process for preparing rubber articles from stable uncoagulated rubber latex which comprises treating rubber latex with zinc oxide and a salt of an organic acid, and heating the treated latex at temperatures below 212° F., depositing the rubber from the latex upon a porous form of the desired shape, and recovering the rubber article from the form.

8. A process for preparing a stable uncoagulated rubber dispersion which comprises treating said dispersion with a compound of a bivalent metal and a salt of an organic acid incapable of influencing vulcanization, and heating the treated dispersion at temperatures below 212° F.

9. A process for preparing a stable uncoagulated unvulcanized rubber latex capable of rapidly depositing its rubber on a porous body which comprises treating a rubber latex with a zinc compound and a salt of an organic oxy acid incapable of influencing vulcanization, and heating the treated latex at temperatures below 212° F.

10. A process for manufacturing rubber articles which consists in preparing a stable uncoagulated rubber latex capable of rapidly depositing its rubber on a porous body by treating rubber latex with zinc oxide and an inorganic salt of an organic acid, heating the treated latex at temperatures below 212° F. and depositing rubber from the latex thus obtained directly on a porous form in the shape desired to make the article.

11. A process for manufacturing rubber articles which consists in preparing a stable uncoagulated rubber latex capable of rapidly depositing its rubber on a porous body by treating rubber latex with zinc oxide and a sodium salt of an oxy acid, heating the treated latex at temperatures below 212° F. and depositing rubber from the latex thus obtained directly on a porous form in the shape desired to make the article.

12. A process for manufacturing rubber articles which consists in preparing a stable uncoagulated rubber latex capable of rapidly depositing its rubber on a porous body by treating rubber latex with zinc oxide, sodium acetate, and heating the treated latex at temperatures below 212° F. and depositing rubber from the latex thus obtained directly on a porous form in the shape desired to make the article.

13. As a new product a stable uncoagulated unvulcanized latex containing zinc ions and acetate ions, said latex having the property of rapidly depositing its rubber on a porous body.

14. A process for manufacturing rubber articles from latex which consists in vulcanizing the latex and depositing the rubber from the vulcanized latex directly on a porous form in the shape desired to make the article.

15. A process for manufacturing rubber articles from latex which consists in vulcanizing the latex at temperatures below those ordinarily employed in hot vulcanization, and depositing the rubber from the vulcanized latex directly on a porous form in the shape desired to make the article.

Signed at New York, county and State of New York, this 21st day of August, 1925.

SIDNEY M. CADWELL.